B. R. HAWLEY. Improvement in Driers.

No. 4,991. Reissued July 16, 1872.

Witnesses.
John H. Stott
Wm H Brown

B R Hawley
Inventor

UNITED STATES PATENT OFFICE.

BENJAMIN R. HAWLEY, OF NORMAL, ILLINOIS.

IMPROVEMENT IN DRIERS.

Specification forming part of Letters Patent No. 84,117, dated November 17, 1868; reissue No. 4,991, dated July 16, 1872.

Specification describing certain new and useful Improvements in Drying-Kilns, invented by BENJAMIN R. HAWLEY, of Normal, in the county of McLean and State of Illinois.

The subject of this invention is a dry-house or kiln, to be used for drying fruit, grain, lumber, clothes, &c. The invention consists of a peculiar arrangement of air-ducts relatively to the dry-house and the draught-chimney. It also consists of a combination therewith of tubular heaters for warming the air which is to do the drying in the house or kiln.

Figure 1:
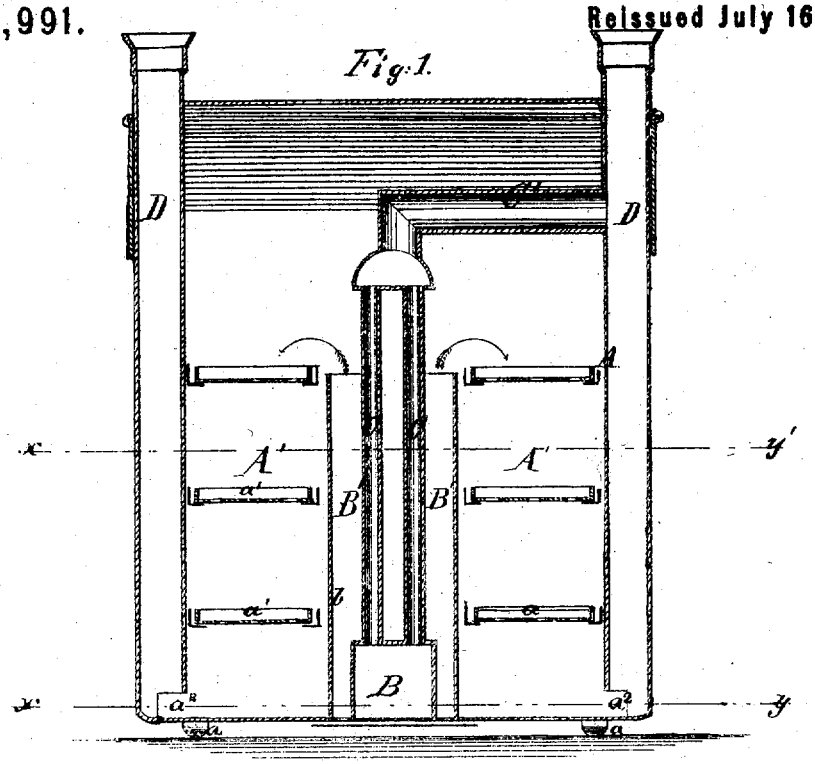
Figure 2:
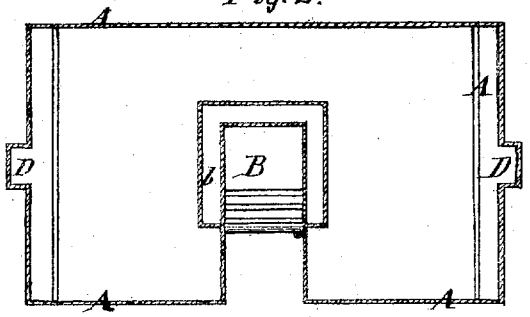
Figure 3:
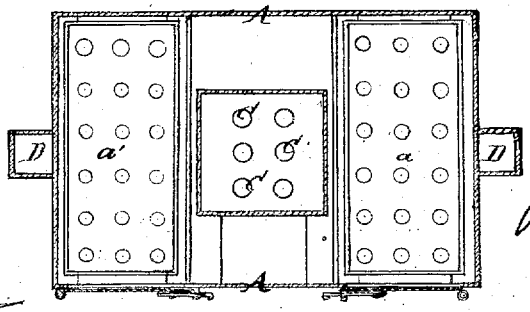

Figure 1 of the accompanying drawing is a sectional elevation, bisecting the said house or kiln longitudinally. Fig. 2 is a horizontal section taken on the line *x y* of Fig. 1, and Fig. 3 is another horizontal section taken on the line *x′ y′* of Fig. 1.

A represents the outer walls of this house or kiln, which may be constructed of any suitable or approved material adapted for the requirements of drying-kilns for using air heated to two or three hundred degrees of heat or more. In the bottom part of the house or drying-chamber will preferably be the fire-box of the heater B, which will be inclosed by the vertical walls of the hot-air chamber B′, so as to leave an air-passage, *b*, surrounding the said fire-box on all sides except that occupied by the fuel-door. From the top part of the fire-box rise the smoke-tubes C, which are also inclosed in the hot-air chamber B′, and which convey the smoke from the furnace to the smoke-pipe C′, and thence to the chimney D. Several small pipes C are used, in order to have more radiating-surface than one large one would give. The hot-air chamber or well B′ extends nearly to the top of the house or kiln, or at least to the height of the top shelf or floor. Surrounding the hot-air chamber, or arranged by the side of it, are the drying-chambers A′, which are fitted with shelves $a^1$, or other equivalent devices, for suspending the articles to be dried. The cold air which is fed into this kiln first enters the chamber or passage *b* at the bottom of the house, which is to stand upon short legs *a* for this purpose; or a cold-air duct may be provided instead. While passing up through this chamber *b*, which is narrow, the cold air comes in direct and intimate contact with the heated plates of the fire-box and the tubes C, and is quickly heated thereby. From the top end of the chamber B′ the heated air will pass over into the chamber A′ in the direction of the arrows and down through the said chambers to the bottom thereof, where it passes into and escapes up through the draught-chimneys D, thus securing a more even and uniform application of the heat than can be had where the air escapes from the top, because in descending from the point where it is discharged into the drying-chamber it first spreads evenly over the whole area, and it tends, naturally, to descend as it becomes charged and cooled with the moisture expelled from the substances under treatment, which is heavier than the heated air. Ducts $a^2$ should be provided at the bottoms of the chambers A′, for affording free passages for the heated air from the corners of said chambers to the said chimneys.

By means of the foregoing arrangements a very large volume of air may be heated and applied to drying purposes, and the heat will be economized, first, by the mode of heating the air in *b* and B′, and, secondly, by having the air pass downward in the manner described.

It will be perceived that no artificial pressure is employed in this form of drier to impel the downward current of heated air, the action of the draught-chimneys D being amply sufficient to withdraw the saturated and cooled air from the bottom of the chamber, the place of which is constantly supplied by the gravitating current of heated air as it condenses and accumulates moisture.

I claim as my invention—

1. An air-heater and a drying-chamber, combined and arranged in such manner that the air not combined with the products of combustion from the heater is delivered into the upper part of the chamber, caused to descend along the articles to be dried as it absorbs the moisture thereof and becomes cooled, and is exhausted from the bottom of the chamber by the natural action of a vertical draught-chimney, substantially as specified.

2. The dry-house or kiln A, when provided with a furnace having an air-inlet, *b*, surrounding the fire-box; also a heating-chamber, B′, which is arranged to conduct the heated air to the top of the building; and also the chimneys D, arranged to take the cold and vitiated air from the bottom of the drying-chamber, substantially as specified.

3. The fire-box B, smoke-tubes C, and hot-air chamber *b* and B′, arranged and combined with the drying-chamber substantially as specified.

B. R. HAWLEY.

Witnesses:
JOHN H. STITT,
WM. H. BROWN.